(12) United States Patent
Liu et al.

(10) Patent No.: US 10,732,478 B2
(45) Date of Patent: Aug. 4, 2020

(54) ELECTROCHROMIC STRUCTURE AND METHOD OF FORMING SAME

(71) Applicant: HEFEI VDI CORPORATION, Hefei, Anhui (CN)

(72) Inventors: Jun Liu, Fremont, CA (US); Shiyou Pei, Jiangsu (CN)

(73) Assignee: HEFEI VDI CORPORATION, Hefei, Anhui (CN)

( * ) Notice: Subject to any disclaimer, the term of this patent is extended or adjusted under 35 U.S.C. 154(b) by 219 days.

(21) Appl. No.: 16/075,587

(22) PCT Filed: May 6, 2016

(86) PCT No.: PCT/CN2016/081232
§ 371 (c)(1),
(2) Date: Aug. 3, 2018

(87) PCT Pub. No.: WO2017/133105
PCT Pub. Date: Aug. 10, 2017

(65) Prior Publication Data
US 2019/0041712 A1 Feb. 7, 2019

(30) Foreign Application Priority Data

Feb. 6, 2016 (CN) .......................... 2016 1 0084079
Feb. 6, 2016 (CN) ..................... 2016 2 0118689 U

(51) Int. Cl.
*G02F 1/155* (2006.01)
*G02F 1/15* (2019.01)
(Continued)

(52) U.S. Cl.
CPC ............... *G02F 1/155* (2013.01); *G02F 1/15* (2013.01); *G02F 1/1525* (2013.01); *G02F 1/1533* (2013.01)

(58) Field of Classification Search
CPC ... G02F 1/00; G02F 1/15; G02F 1/155; G02F 2001/1351
See application file for complete search history.

(56) References Cited

U.S. PATENT DOCUMENTS

| 5,724,175 A | 3/1998 | Hichwa et al. |
| 5,956,170 A | 9/1999 | Miyagaki et al. |

(Continued)

FOREIGN PATENT DOCUMENTS

| CN | 1470083 A | 1/2004 |
| CN | 1659473 A | 8/2005 |

(Continued)

OTHER PUBLICATIONS

International Search Report for PCT/CN2016/081232 dated Oct. 28, 2016, ISA/CN.

(Continued)

*Primary Examiner* — Robert E. Tallman
(74) *Attorney, Agent, or Firm* — Yue (Robert) Xu; Apex Attorneys at Law, LLP

(57) ABSTRACT

An electrochromic structure includes: a substrate including a first surface and a second surface opposite to the first surface; a first conductive layer located on the first surface; a color changing functional layer located on a surface of the first conductive layer; a second conductive layer located on a surface of the color changing functional layer, where the second conductive layer is divided into a first isolation region and a first conductive region which are electrically isolated; a first electrode located in the first isolation region, where the first electrode penetrates the color changing functional layer and is electrically connected to the first conductive layer; a second electrode located on a surface of and electrically connected to the second conductive layer in (Continued)

the first conductive region; and a first light shielding layer for shielding the first isolation region.

34 Claims, 9 Drawing Sheets

(51) Int. Cl.
*G02F 1/1523* (2019.01)
*G02F 1/153* (2006.01)

(56) References Cited

U.S. PATENT DOCUMENTS

| | | | |
|---|---|---|---|
| 2010/0328751 A1 | 12/2010 | Kondou et al. | |
| 2012/0038967 A1 | 2/2012 | Copeland et al. | |
| 2014/0182125 A1 | 7/2014 | Rozbicki et al. | |
| 2014/0253996 A1* | 9/2014 | Burdis | G02F 1/155 359/265 |
| 2015/0029573 A1 | 1/2015 | Burdis et al. | |
| 2015/0268530 A1 | 9/2015 | Xu et al. | |
| 2017/0190290 A1* | 7/2017 | Lin | B60R 1/088 |

FOREIGN PATENT DOCUMENTS

| | | |
|---|---|---|
| CN | 101300523 A | 11/2008 |
| CN | 101802700 A | 8/2010 |
| CN | 102736342 A | 10/2012 |
| CN | 103969905 A | 8/2014 |
| CN | 105190420 A | 12/2015 |
| WO | 02/43168 A2 | 5/2002 |
| WO | 03/104884 A2 | 12/2003 |

OTHER PUBLICATIONS

First Office Action dated Mar. 16, 2020 for Chinese patent application No. 201610084079.X, English translation provided by Global Dossier.

* cited by examiner

ELECTROCHROMIC STRUCTURE AND METHOD OF FORMING SAME

The present application is a national phase application of PCT international patent application PCT/CN2016/081232, filed on May 6, 2016 which claims priority to Chinese Patent Application No. 201610084079.X, titled "ELECTRO CHROMIC STRUCTURE AND METHOD OF FORMING SAME", filed on Feb. 6, 2016 with the State Intellectual Property Office of People's Republic of China, and Chinese Patent Application No. 201620118689.2, titled "ELECTROCHROMIC STRUCTURE", filed on Feb. 6, 2016 with the State Intellectual Property Office of People's Republic of China, all of which are incorporated herein by reference in their entireties.

FIELD

The present disclosure relates to the technical field of glasses, and in particular to an electrochromic structure and a method for forming the electrochromic structure.

BACKGROUND

Electrochromism means that under an applied electric field, characteristics of a material, such as reflectivity, transmittance and absorptivity, can be changed reversibly based on a magnitude and polarity of the electric field. An electrochromic structure is arranged on a surface of a glass to form an electrochromic glass, such that a light transmitting performance of the glass can be controlled by controlling an applied voltage.

According to a report of the US Green Building Committee, energy consumed by buildings accounts for nearly 40% of the totally consumed energy. Heat loss from windows with poor isolation performance accounts for 10% to 30% of heat loss of buildings in winter. In summer, light passing through windows and into a building increases energy required for indoor cooling. It is estimated that, in the US, energy loss caused by glass windows of buildings is worth about 20 billion dollars each year.

With the electrochromic glass, amount of transmitting light and glaring light through an electrochromic glass can be controlled, such that the amount of transmitting light through the glass and an amount of heat through the glass can be optimized to keep the indoor condition comfortable, thereby reducing energy consumed in maintaining a certain temperature inside the building. Therefore, with the rapid development of material technology, the electrochromic glasses are gradually applied to fields such as automotive anti-glare mirrors, automotive sunroofs, windows for high-speed trains, windows for aircrafts and glass-curtain wall in high-end buildings. Moreover, with the gradual reduction of a comprehensive energy using cost, the electrochromic glass can gradually replace Low-e glasses, such that the electrochromic glass is widely used in energy-saving and environmental-friendly smart buildings.

However, the electrochromic glass according to the conventional technology often leak light when the electrochromic glass changes color due to an applied voltage around the electrochromic glass.

SUMMARY

An electrochromic structure and a method for forming the electrochromic structure are provided according to the present disclosure, to improve performance of an electrochromic glass.

In order to solve the above light leakage problem around the electrochromic glass, an electrochromic structure is provided according to the present disclosure, which includes:

a substrate including a first surface and a second surface opposite to the first surface;

a first conductive layer located on the first surface of the substrate;

a color changing functional layer located on a surface of the first conductive layer;

a second conductive layer located on a surface of the color changing functional layer, where the second conductive layer is divided into a first isolation region and a first conductive region electrically isolated from each other;

a first electrode located in the first isolation region of the second conductive layer, where the first electrode penetrates through the color changing functional layer and is electrically connected to the first conductive layer;

a second electrode located on a surface of the second conductive layer in the first conductive region, where the second electrode is electrically connected to the second conductive layer in the first conductive region; and a first light shielding layer for shielding the first isolation region.

Optionally, the first light shielding layer covers the first electrode and the second conductive layer in the first isolation region.

Optionally, the first light shielding layer covers a portion of the second surface of the substrate located opposite to the first isolation region.

Optionally, a projected area of the first light shielding layer on a surface of the substrate is greater than a projected area of the first isolation region on the surface of the substrate.

Optionally, the electrochromic structure further includes a first trench across the second conductive layer. The second conductive layer is divided into a first isolation region and a first conductive region by the first trench; and the first light shielding layer further shields the first trench.

Optionally, the first light shielding layer covers the first electrode and the second conductive layer in the first isolation region, and extends into the first trench.

Optionally, the first light shielding layer covers a portion of the second surface of the substrate located opposite to the first isolation region and the first trench.

Optionally, the first conductive layer includes a second isolation region and a second conductive region electrically isolated from each other. The electrochromic structure further includes a second light shielding layer for shielding the second isolation region.

Optionally, a position of the second electrode is opposite to a position of the second isolation region, and the second light shielding layer covers the second electrode and a portion of the second conductive layer in the first conductive region located opposite to the second isolation region.

Optionally, the second light shielding layer covers a portion of the second surface of the substrate located opposite to the second isolation region.

Optionally, a projected area of the second light shielding layer on a surface of the substrate is greater than a projected area of the second isolation region on the surface of the substrate.

Optionally, the electrochromic structure further includes a second trench across the first conductive layer. The first conductive layer is divided into a second isolation region and a second conductive region by the second trench. The second light shielding layer further shields the second trench.

Optionally, a position of the second electrode is opposite to a position of the second isolation region, and the second light shielding layer covers the second electrode and a portion of the second conductive layer in the first conductive region located opposite to the second isolation region and the second trench.

Optionally, the second light shielding layer covers a portion of the second surface of the substrate located opposite to the second isolation region and the second trench.

Optionally, a width of the first isolation region and a width of the second isolation region range from 1 µm to 500 µm, a width of the first conductive region and a width of the second conductive region range from 1 cm to 500 cm.

Optionally, the substrate includes a light transmitting substrate.

Optionally, the electrochromic structure further includes a blocking layer located between the substrate and the first conductive layer.

Optionally, the first conductive layer and the second conductive layer are made of a material including a transparent conductive oxide.

Correspondingly, a method for forming an electrochromic structure is provided according to the disclosure. The method includes:

providing a substrate, where the substrate includes a first surface and a second surface opposite the first surface;
forming a first conductive layer on the first surface of the substrate;
forming a color changing functional layer on a surface of the first conductive layer;
forming a second conductive layer on a surface of the color changing functional layer, where the second conductive layer includes a first isolation region and a first conductive region electrically isolated from each other;
forming a first electrode in the first isolation region of the second conductive layer, where the first electrode penetrates through the color changing functional layer and is electrically connected to the first conductive layer;
forming a second electrode on a surface of the second conductive layer in the first conductive region, where the second electrode is electrically connected to the second conductive layer in the first conductive region; and
forming a first light shielding layer for shielding the first isolation region.

Optionally, the first light shielding layer covers the first electrode and the second conductive layer in the first isolation region.

Optionally, the first light shielding layer is formed at a portion of the second surface of the substrate located opposite to the first isolation region.

Optionally, a projected area of the first light shielding layer on a surface of the substrate is greater than a projected area of the first isolation region on the surface of the substrate.

Optionally, after forming the second conductive layer and before forming the first electrode, the method further includes: forming a first trench across the second conductive layer. The second conductive layer is divided into a first isolation region and a first conductive region by the first trench. The first light shielding layer further shields the first trench.

Optionally, the first light shielding layer covers the first electrode and the second conductive layer in the first isolation region, and extends into the first trench.

Optionally, the method further includes: forming the first light shielding layer at a portion of the second surface of the substrate located opposite to the first isolation region and the first trench.

Optionally, the first conductive layer includes a second isolation region and a second conductive region electrically isolated from each other. The method further includes: forming a second light shielding layer for shielding the second isolation region.

Optionally, a position of the second electrode is opposite to a position of the second isolation region, and the second light shielding layer covers the second electrode and a portion of the second conductive layer in the first conductive region located opposite to the second isolation region.

Optionally, the second light shielding layer is formed at a portion of the second surface of the substrate located opposite to the second isolation region.

Optionally, a projected area of the second light shielding layer on a surface of the substrate is greater than a projected area of the second isolation region on the surface of the substrate.

Optionally, after forming the first conductive layer and before forming the color changing functional layer, the method further includes: forming a second trench across the first conductive layer. The first conductive layer is divided into a second isolation region and a second conductive region by the second trench. The second light shielding layer further shields the second trench.

Optionally, a position of the second electrode is opposite to a position of the second isolation region, and the second light shielding layer covers the second electrode and a portion of the second conductive layer in the first conductive region located opposite to the second isolation region and the second trench.

Optionally, the second light shielding layer is formed at a portion of the second surface of the substrate located opposite to the second isolation region and the second trench.

Optionally, the first light shielding layer or the second light shielding layer is formed in a manner of screen printing, vacuum thermal evaporation coating, vacuum magnetron sputtering coating, vacuum ion source coating or inkjet printing.

As compared with the conventional technology, the technical solutions of the present disclosure have the following advantages.

In the present disclosure, a first light shielding layer for shielding light is arranged to shield the first isolation region, such that light leaked from the first isolation region can be shielded after the electrochromic glass changes color, thereby facilitating the improvement of color changing uniformity of the electrochromic glass, thus improving the performance of electrochromic glass.

Alternatively, in a solution of the present disclosure, the first conductive layer further includes a second isolation region and a second conductive region electrically isolated from each other, such that the electrochromic glass further includes a second light shielding layer for shielding the second isolation region to shield the light leaked from the second isolation region, thereby facilitating the improving of color changing uniformity of the electrochromic glass, thus improving an electrochromic performance.

Alternatively, in an solution of the present disclosure, a projected area of the first light shielding layer on the surface of the substrate is greater than a projected area of the first isolation region on the surface of the substrate, and a projected area of the second light shielding layer on the surface of the substrate is larger than a projected area of the second isolation region on the surface of the substrate, thereby reducing light leaked due to diffraction of light, thus further improving a light shading performance of the electrochromic glass.

DETAILED DESCRIPTION OF EMBODIMENTS

It can be known from the background that there is a problem of light leakage in the electrochromic glass according to the conventional technology. Hereinafter, reasons for the light leakage in the electrochromic glass are analyzed in conjunction with a structure of an electrochromic structure in the electrochromic glass according to the conventional technology.

Figure 1:
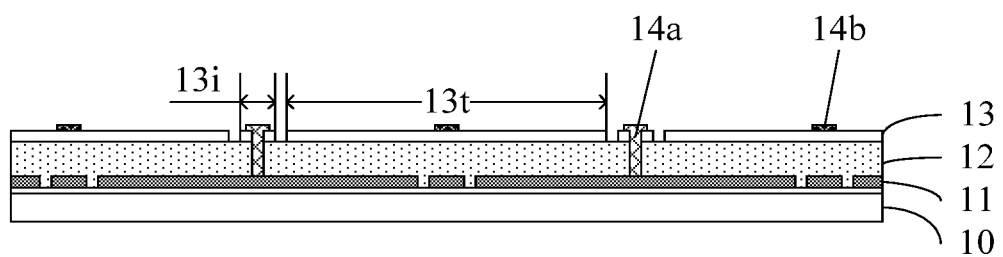
FIG. 1 is a schematic sectional view of an electrochromic structure.

Referring to FIG. 1, a schematic sectional view of an electrochromic structure is shown.

As shown in FIG. 1, the electrochromic glass includes a substrate 10 and a first conductive layer 11, an electrochromic layer 12 and a second conductive layer 13 sequentially located on a surface of the substrate 10. A first electrode 14a sequentially penetrates through the second conductive layer 13 and the electrochromic layer 12. A second electrode 14b is located on a surface of the second conductive layer 13. The first electrode 14a is electrically connected to the first conductive layer 11 to apply a voltage signal to the first conductive layer 11, the second electrode 14b is electrically connected to the second conductive layer 13 to apply a voltage signal to the second conductive layer 13, such that an electric field is formed between the first conductive layer 11 and the second conductive layer 13 to control a color of the electrochromic layer 12.

In order to avoid a short circuit between the first electrode 14a and the second electrode 14b, the second conductive layer 13 is divided into a first isolation region 13i and a first conductive region 13t electrically isolated from each other. The first electrode 14a is located in the first isolation region 13i. The second electrode 14b is located in the first conductive region 13t.

Since the first electrode 14a is located in the first isolation region 13i, the second conductive layer 13 in the first isolation region 13i has the same potential as a region of the first conductive layer 11 located opposite to the first isolation region 13i, such that no electric field can be formed. Therefore, in a case where a voltage is applied to change color, a color of the electrochromic layer 12 between the first isolation region 13i of the second conductive layer 13 and the region of the first conductive layer 11 located opposite to the first isolation region 13i may not be changed, thereby occurring light leakage.

The embodiments of the present disclosure are described in detail with reference to the accompanying drawings hereinafter.

Figure 2:
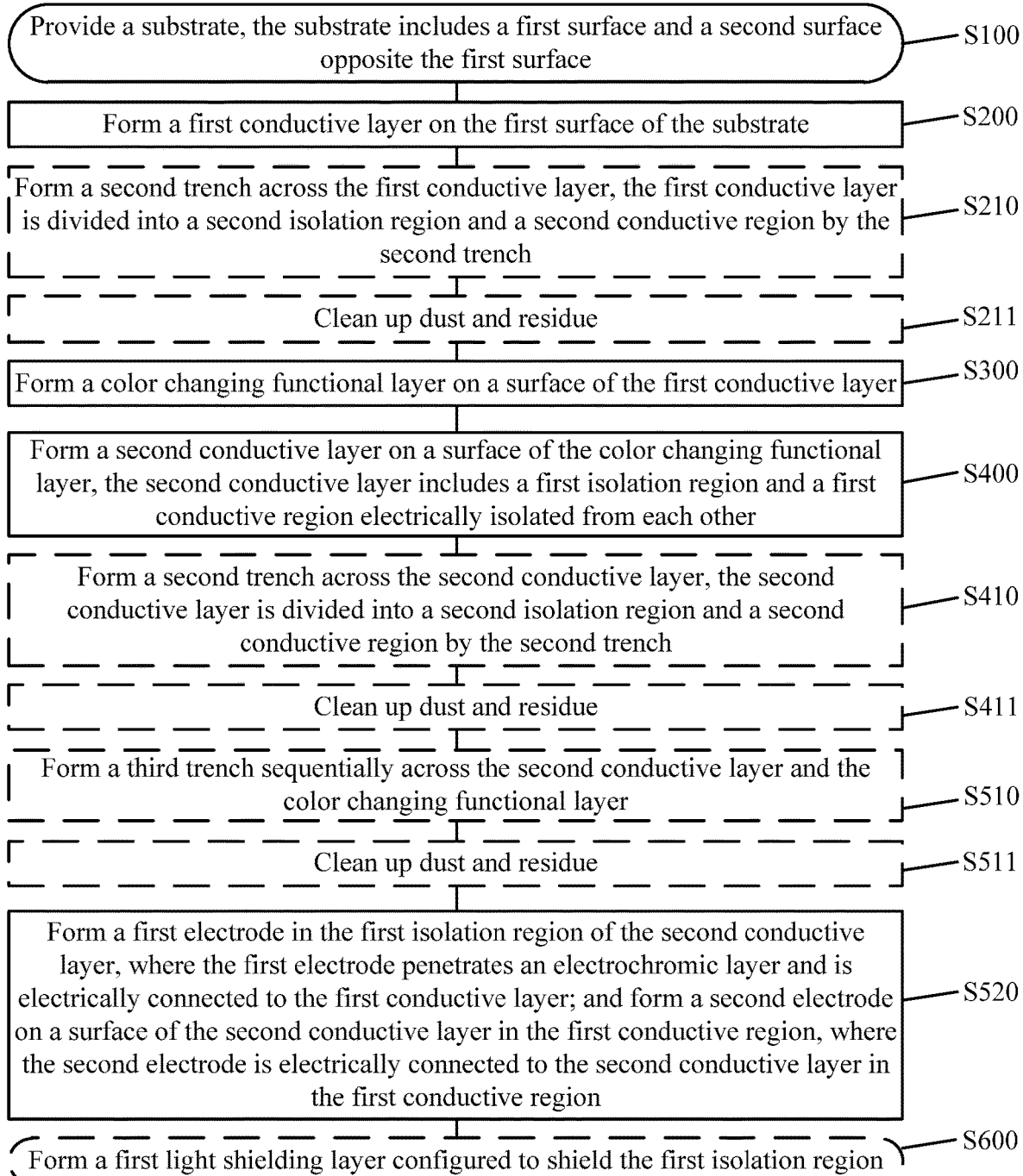
FIG. 2 is a schematic flow chart of a method for forming an electrochromic structure according to an embodiment of the present disclosure.

FIG. 2 is a schematic flow chart of a method for forming an electrochromic structure according to an embodiment of the present disclosure.

FIG. 3 to FIG. 15 are schematic structural diagrams of intermediate structures in steps of a method for forming an electrochromic structure according to an embodiment of the present disclosure.

Figure 3:
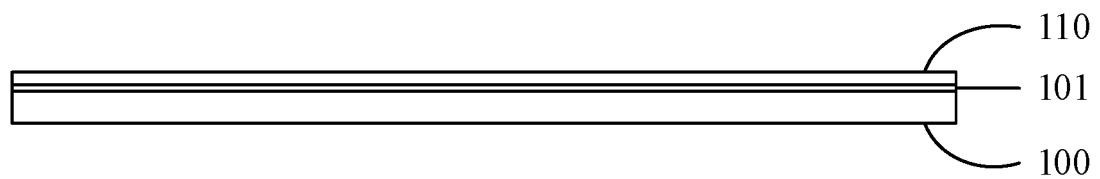
FIG. 3 to FIG. 15 are schematic structural diagrams of intermediate structures in steps of a method for forming an electrochromic structure according to an embodiment of the present disclosure.

Referring to step S100 in FIG. 2 and in conjunction with FIG. 3, first, a substrate 100 is provided. The substrate 100 includes a first surface and a second surface opposite to the first surface.

The substrate is used to provide a physical support platform. The substrate 100 may be a flexible substrate or a rigid substrate. The substrate 100 may be made of a light transmitting material. In some embodiments, the substrate 100 is made of glass.

In some embodiments, an electrochromic glass may be formed by directly laminating a glass onto a formed electrochromic structure, which can simplify a structure of the electrochromic glass and reduce a weight of the electrochromic glass.

The number of the electrochromic structures is not limited. In another embodiment, the electrochromic structure may be formed by sandwiching an electrochromic structure between two glasses, thereby reducing a requirement for a process board, thus reducing a manufacturing cost.

Referring to step S200 in FIG. 2 and continually in conjunction with FIG. 3, a first conductive layer 110 is formed on the first surface of the substrate 100.

The first conductive layer 110 is formed on the first surface of the substrate 100. The first conductive layer 110 is configured to generate a voltage to form an electric field. The first conductive layer 110 is made of a transparent conductive oxide (TCO). In an example, the first conductive layer 110 may be made of one or more of the following materials: indium tin oxide (ITO), zinc tin oxide (IZO), aluminum zinc oxide (AZO), fluorine-doped tin oxide (FTO), gallium-doped tin oxide (GTO) and the like. Alternatively, the first conductive layer 110 may be made of a conductive transparent nitride including one or more of the following materials: titanium nitride, titanium oxynitride, tantalum nitride, tantalum oxynitride and the like. Alternatively, the first conductive layer 110 may be made of a transparent conductive Graphene material. Alternatively, the first conductive layer 110 may be made of another transparent metal or alloy material. A thickness of the first conductive layer 110 may range from 10 nm to 1000 nm. Optionally, in some embodiments, the thickness of the first conductive layer 110 ranges from 100 nm to 600 nm.

It is to be noted that, in order to prevent that impurity ions are diffused into the first conductive layer 110 to affect a conductive performance of the first conductive layer 110, the electrochromic structure further includes a blocking layer 101 located between the substrate 100 and the first conductive layer 110. Therefore, before forming the first conductive layer 110, the method may further include: forming a blocking layer 101 covering the surface of the substrate 100.

In some embodiments, the substrate 100 is made of soda glass. In order to prevent a case that sodium ions in the soda glass are diffused into the first conductive layer 110 to decrease an electrical conductivity of the first conductive layer 110, the blocking layer 101 is a sodium ion blocking layer made of one or more of the following materials: silicon dioxide, silicon nitride, silicon oxynitride, aluminum oxide and the like.

Figure 4:
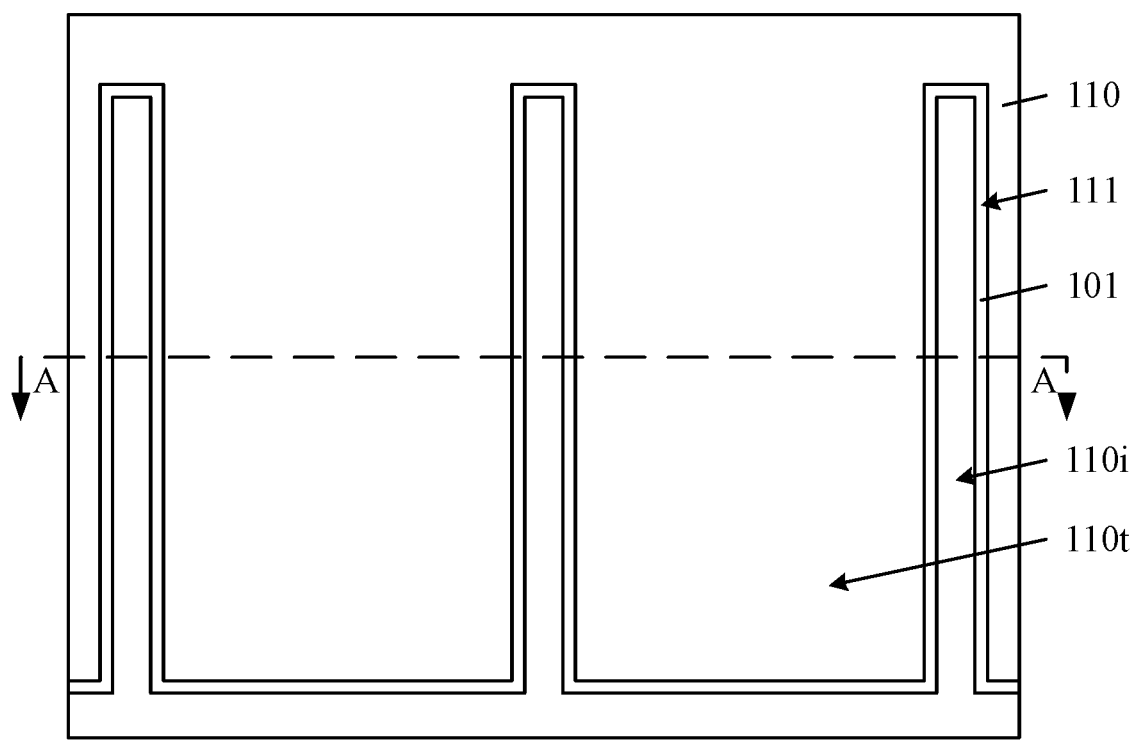
Figure 5:
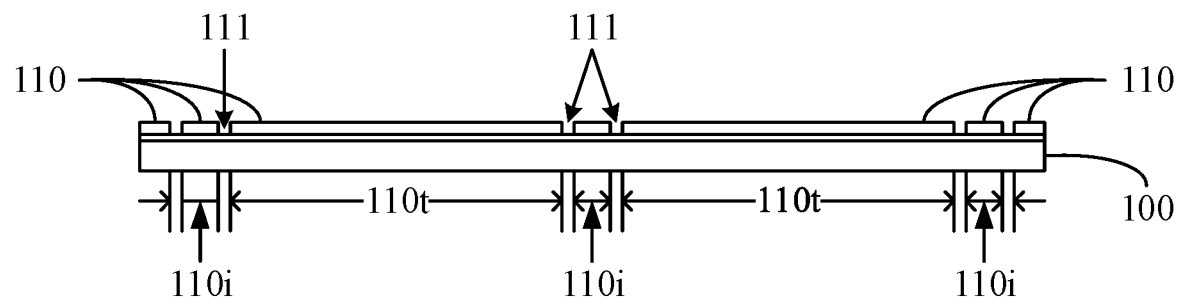
Figure 6:
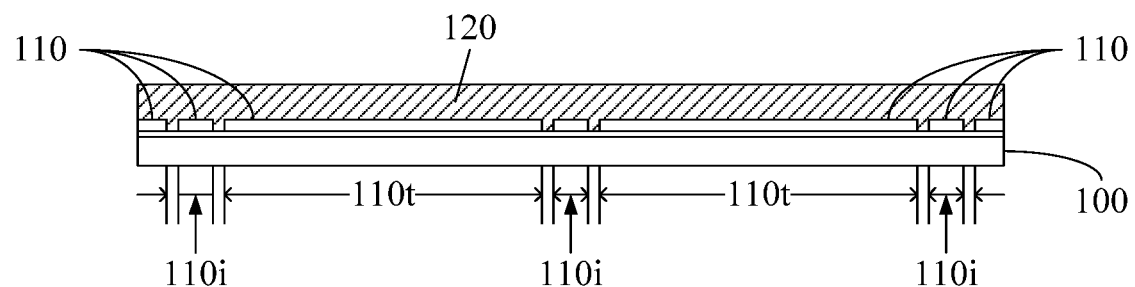

Referring to FIG. 4 to FIG. 6, a color changing functional layer 120 is formed on a surface of the first conductive layer 110.

It is to be noted that in order to improve electrical isolation between the first conductive layer 110 and a subsequently formed second electrode so as to avoid power leakage or short circuit, the first conductive layer 110 includes a second isolation region and a second conductive region electrically isolated from each other. The number of the second isolation regions may be one or more, and the number of the second conductive regions may be one or more.

In order to simplify a device structure and reduce process difficulty, in some embodiments of the present disclosure, isolation between the second isolation region and the second conductive region is achieved by a second trench. Therefore, referring to step S210 in FIG. 2, after the first conductive layer is formed, the second trench across the first conductive layer is formed. The first conductive layer is divided into a second isolation region and a second conductive region by the second trench.

Reference is made to FIG. 4 and FIG. 5, where FIG. 4 is a schematic top view of an intermediate structure of the electrochromic structure, and FIG. 5 is a sectional view taken along line AA in FIG. 4. After forming the first conductive layer 110, the method further includes: forming a lower trench 111 across the first conductive layer 110. The first conductive layer 110 is divided into a lower isolation region 110$i$ and a lower conductive region 110$t$ by the lower trench 111. The lower trench 111 constitutes the second trench, the lower isolation region 110$i$ constitutes the second isolation region, and the lower conductive region 110$t$ constitutes the second conductive region.

A width of the lower isolation region 110$i$ ranges from 1 μm to 500 μm. A width of the lower conductive region 110$t$ ranges from 1 cm to 500 cm. In order to improve color changing uniformity and color changing speed of the electrochromic structure, optionally, the width of the lower isolation region 110$i$ ranges from 5 μm to 50 μm, and the width of the lower conductive region 110$t$ ranges from 5 cm to 50 cm.

The lower trench 111 may extend along a shape of "儿". Formed multiple lower isolation regions 110$i$ communicate to one another to form a comb shape. Multiple lower conductive regions 110$t$ communicate to one another to form a comb shape. The comb shape formed by the multiple lower conductive regions 110$t$ and the comb shape formed by the multiple lower isolation regions 110$i$ engage with each other. A width of the lower isolation region 110$i$ (a width of a comb tooth) ranges from 5 cm to 50 cm. The lower conductive region 110$t$ is located between adjacent comb teeth. A width of the lower conductive region 110$t$ ranges from 5 cm to 50 cm. A width of the lower trench 111 ranges from 1 μm to 50 μm. Optionally, the width of the lower trench 111 ranges from 2 μm to 10 μm to improve insulation between the lower isolation region 110$i$ and the lower conductive region 110$t$.

The lower trench 111 may be formed in the first conductive layer 110 with a laser scribing process. In an example, the lower trench 111 may be formed with a visible light laser scribing process or an infrared light laser scribing process. In addition, in the laser scribing process, a constant power output or a pulsed power output may be adopted. Optionally, in some embodiments, the lower trench 111 is formed with a pulsed laser scribing process, a frequency of the pulse ranges from 5 KHz to 500 KHz, and a power of the laser ranges from 0.1 W to 10 W. In some embodiments, the power of the laser ranges from 0.5 W to 5 W. It is to be noted that the method for forming the lower trench 111 with the laser scribing process is only an example, and the method for forming the lower trench 111 is not limited in the present disclosure.

It is to be noted that, referring to step S211 in FIG. 2, in some embodiments, after the step of forming the lower trench 111 and before the step of forming the color changing functional layer 120, the method further includes a step of cleaning up dust and residue, so as to obtain a clean craft surface.

Next, referring to step S300 in FIG. 2 and in conjunction with FIG. 6, the color changing functional layer 120 is formed on the surface of the first conductive layer 110.

It is to be noted that, in some embodiments, after the step of forming the lower trench 111 and before the step of forming the color changing functional layer 120, the method further includes a step of cleaning up dust and residue, so as to remove dust and residue generated in the process of forming the trench 111, to provide a clean surface for subsequent process steps.

The color changing functional layer 120 is configured to change color under control of a voltage. The color changing functional layer 120 includes one or more functional layers. The step of forming the color changing functional layer 120 includes: forming one or more functional layers. The functional layers include an electrochromic layer, an ion storage layer and an ion transporting layer located between the electrochromic layer and the ion storage layer.

An oxidation-reduction reaction is generated in the electrochromic layer under an action of an applied electric field, such that a color of the electrochromic layer is changed. The electrochromic layer may be made of a cathode electrochromic metal oxide, that is, a metal oxide with a color being changed after ions are injected into the metal oxide, which includes one or more of the following materials: underoxidized tungsten oxide ($WO_x$, where $2.7<x<3$), titanium oxide ($TiO_2$), vanadium oxide ($V_2O_5$), niobium oxide ($Nb_2O_5$), molybdenum oxide ($MoO_3$), tantalum oxide ($Ta_2O_5$) and the like. Alternatively, the electrochromic layer may be made of a lithium-doped, sodium-doped, potassium-doped, vanadium-doped or titanium-doped cathode electrochromic metal oxide. A thickness of the electrochromic layer may range from 10 nm to 1000 nm. Optionally, the thickness of the electrochromic layer ranges from 300 nm to 600 nm.

The ion transporting layer is configured to transport ions. The ion transporting layer may be made of one or more of the following materials: $Li_2O$, $Li_2O_2$, $Li_3N$, LiI, LiF, $SiO_2$, $Al_2O_3$, $Nb_2O_3$, $LiTaO_3$, $LiNbO_3$, $La_2TiO_7$, $Li_2WO_4$, oxygen-enriched tungsten oxide ($WO_x$, where $3<x<3.5$), $HWO_3$, $ZrO_2$, $HfO_2$, $LaTiO3$, $SrTiO_3$, $BaTiO_3$, $LiPO_3$ and the like. A thickness of the ion transporting layer ranges from 10 nm to 300 nm. Optionally, the thickness of the ion transporting layer ranges from 20 nm to 150 nm.

The ion storage layer is configured to store ions with a certain quantity of positive electric charges and ions with the same quantity of negative electric charges as the positive electric charges, to maintain a balance of electric charges as a whole. The ion storage layer may be made of an anodic electrochromic metal oxide, that is, a metal oxide with a color being changed after ions are injected into the metal oxide, which included one or more of the following materials: vanadium oxide ($V_2O_5$), chromium oxide ($Cr_2O_3$), manganese oxide ($Mn_2O_3$), iron oxide ($Fe_2O_3$), cobalt oxide ($Co_2O_3$), nickel oxide ($Ni_2O_3$), iridium oxide ($IrO_2$), nickel tungsten oxide, nickel vanadium oxide, nickel titanium oxide, nickel niobium oxide, nickel molybdenum oxide, nickel tantalum oxide and the like. Alternatively, the ion storage layer may be made of a mixed metal oxide $Li_xNi_yM_zO_a$, where $0<x<10$, $0<y<1$, $0<z<10$, $(0.5x+1+0.5y+z)<a<(0.5x+1+0.5y+3.5z)$, M may be a kind of metal such as Al, Cr, Zr, W, V, Nb, Hf, Y, and Mn. A thickness of the ion storage layer ranges from 10 nm to 1000 nm. Optionally, the thickness of the ion storage layer ranges from 100 nm to 300 nm.

In addition, in the embodiment of the present disclosure, the step of forming the functional layer includes: sequentially forming the electrochromic layer, the ion transporting layer and the ion storage layer in a direction away from the substrate 100; or sequentially forming the ion storage layer, the ion transporting layer and the electrochromic layer in the direction away from the substrate 100. The functional layer may be formed with a film deposition process such as chemical vapor deposition, physical vapor deposition and atomic layer deposition.

It is to be noted that the color changing functional layer 120 further extends into the lower trench 111.

Figure 7:
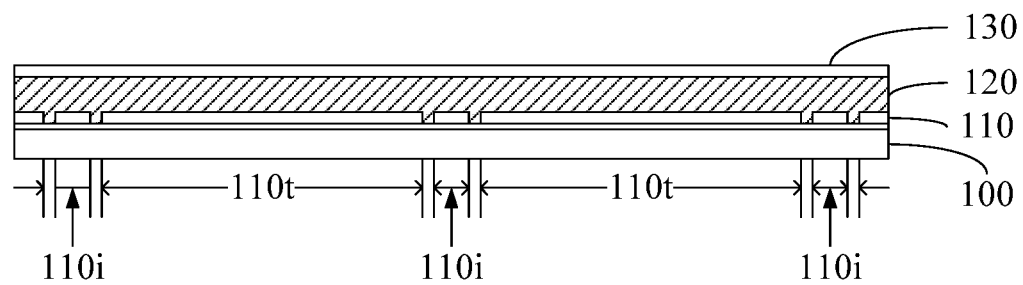

Referring to step S400 in FIG. 2 and in conjunction with FIG. 7, a second conductive layer 130 is formed on a surface of the color changing functional layer 120.

The second conductive layer 130 is configured to generate a voltage to form an electric field. The second conductive layer 130 may be made of a transparent conductive oxide (TCO). The second conductive layer 130 may be made of one or more of the following materials: indium tin oxide (ITO), zinc tin oxide (IZO), aluminum zinc oxide (AZO), fluorine-doped tin oxide (FTO), gallium-doped tin oxide (GTO) and the like. Alternatively, the second conductive layer 130 may be made of a conductive transparent nitride including one or more of the following materials: titanium nitride, titanium oxynitride, tantalum nitride, tantalum oxynitride and the like. Alternatively, the second conductive layer 130 may be made of a transparent conductive Graphene material. Alternatively, the second conductive layer 130 may be made of another transparent metal or alloy material. A thickness of the second conductive layer 130 may range from 10 nm to 1000 nm. Optionally, in some embodiments, the thickness of the second conductive layer 130 ranges from 100 nm to 600 nm. The second conductive layer 130 may be formed with a film deposition process such as chemical vapor deposition, physical vapor deposition and atomic layer deposition.

The second conductive layer includes a first isolation region and a first conductive region electrically isolated from each other. The number of the first isolation regions is one or more, and the number of the first conductive regions is one or more. In some embodiments of the present disclosure, the first isolation region is electrically isolated from the first conductive region of the second conductive layer by a first trench. Referring to step S410 in FIG. 2, after the second conductive layer is formed, the first trench across the second conductive layer is formed. The second conductive layer is divided into the first isolation region and the first conductive region by the first trench.

Figure 8:
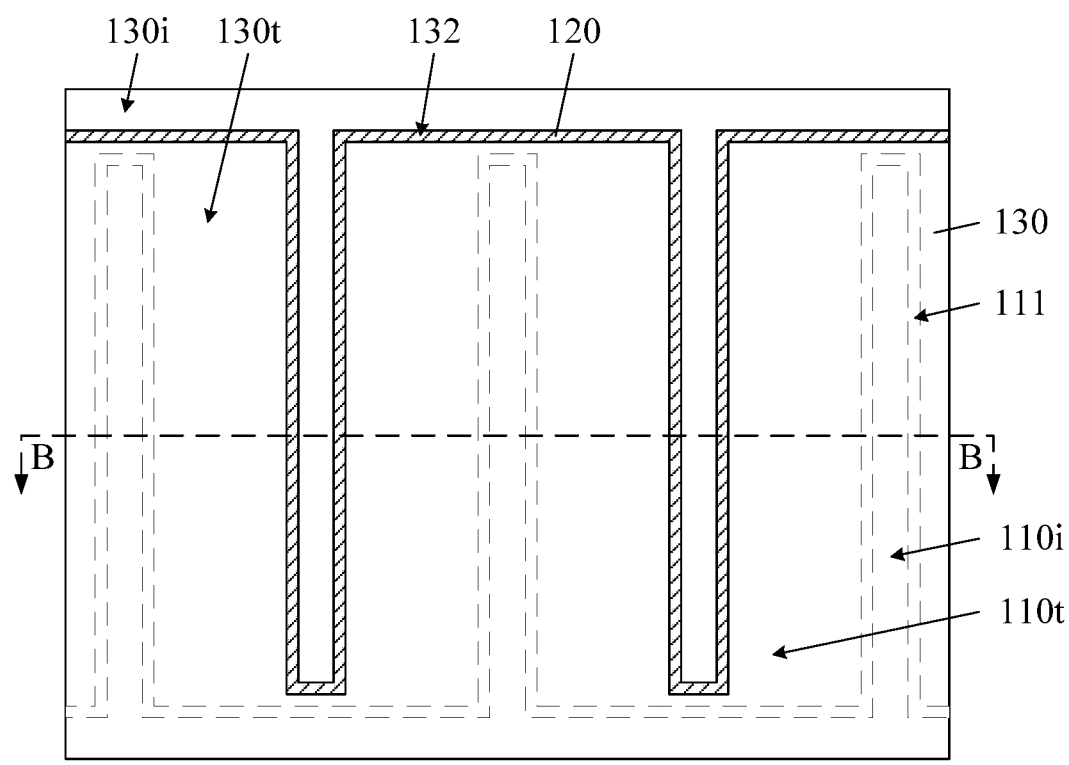
Figure 9:
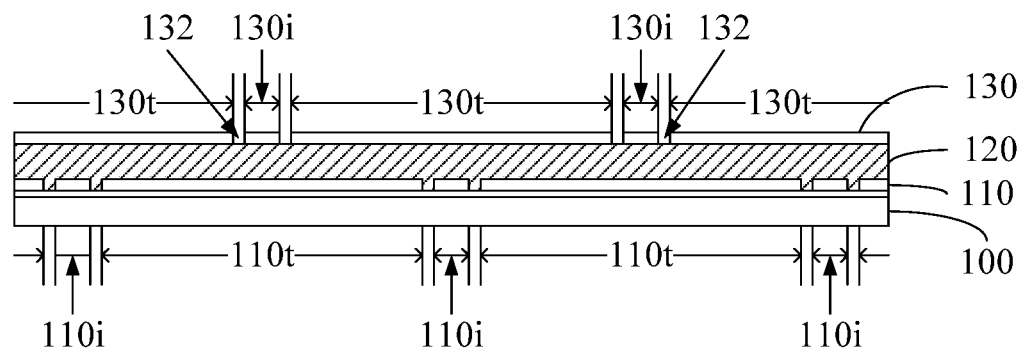

Reference is made to FIG. 8 and FIG. 9, where FIG. 8 is a schematic top view of an intermediate structure of the electrochromic structure, and FIG. 9 is a sectional view taken along line BB in FIG. 8. After forming the second conductive layer 130, the method further includes: forming an upper trench 132 across the second conductive layer 130. The second conductive layer 130 is divided into an upper isolation region 130i and an upper conductive region 130t by the upper trench 132. The upper trench 132 constitutes the first trench, the upper isolation region 130i constitutes the first isolation region, and the upper conductive region 130t constitutes the first conductive region.

The upper trench 132 may extend along a shape of "几". Formed multiple upper isolation regions 130i communicate to one another to form a comb shape. Multiple upper conductive regions 130t communicate to one another to form a comb shape. The comb shape formed by the multiple upper conductive regions 130t and the comb shape formed by the multiple upper isolation regions 130i engage with each other. A width of the upper isolation region 130i (a width of a comb teeth) ranges from 5 μm to 50 μm. The upper conductive region 130t is located between adjacent comb teeth. A width of the upper conductive region 130t ranges from 5 cm to 50 cm.

It is to be noted that, in order to avoid circuit problems such as power leakage and short circuit, a projection of the upper isolation region 130i and a projection of the lower isolation region 110i on the surface of the substrate 100 are offset from each other. That is, the projection of the upper isolation region 130i and the projection of the lower isolation region 110i on the surface of the substrate 100 do not overlap with each other.

A width of the upper trench 132 ranges from 1 μm to 50 μm. Optionally, the width of the upper trench 132 ranges from 2 μm to 10 μm to improve the insulation between the upper isolation region 130i and the upper conductive region 130t.

The upper trench 132 may be formed in the second conductive layer 130 with a laser scribing process. In an example, the upper trench 132 may be formed with a visible light laser scribing process or an infrared light laser scribing process. In addition, in the laser scribing process, a constant power output or a pulsed power output may be adopted. Optionally, in some embodiments, the upper trench 132 is formed with a pulsed laser scribing process, a frequency of the pulse ranges from 5 KHz to 500 KHz, and a power of the laser ranges from 0.1 W to 10 W. In some embodiments, the power of the laser ranges from 0.5 W to 5 W. It is to be noted that the method for forming the upper trench 132 with the laser scribing process is only an example, and the method for forming the upper trench 132 is not limited in the present disclosure.

It is to be noted that, referring to step S411 in FIG. 2, after the step of forming the upper trench 132, the method may further include a step of cleaning up dust and residue, so as to improve a manufacturing yield of the electrochromic structure.

Figure 10:
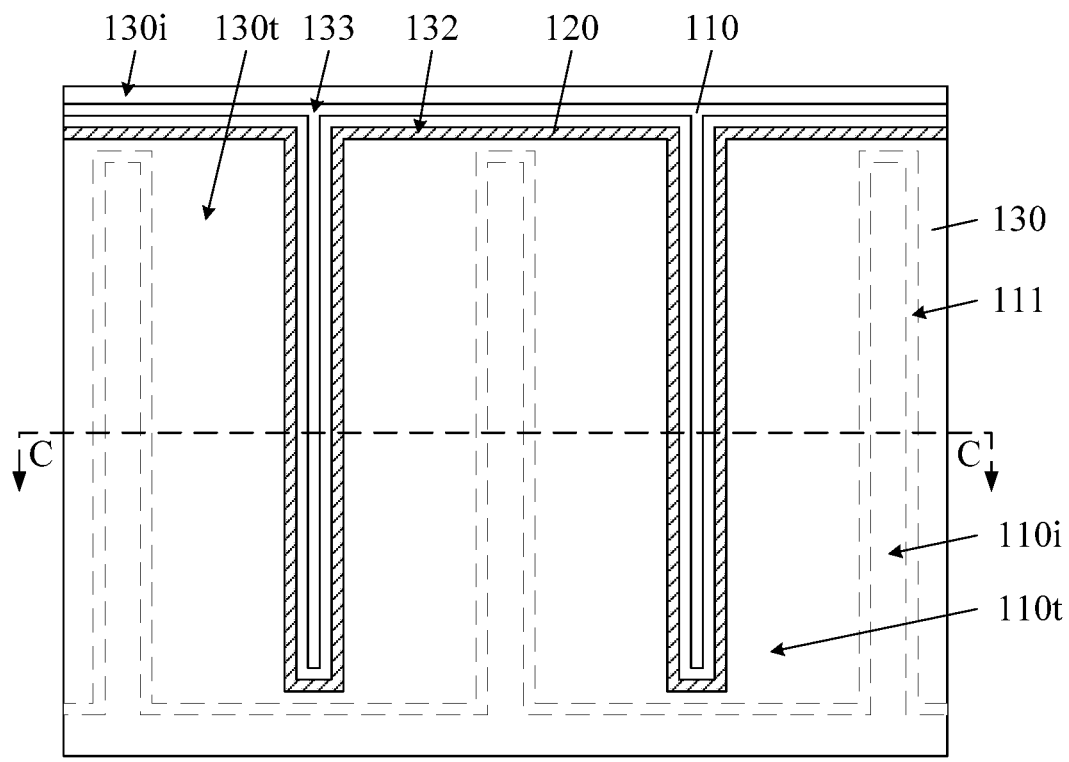
Figure 11:
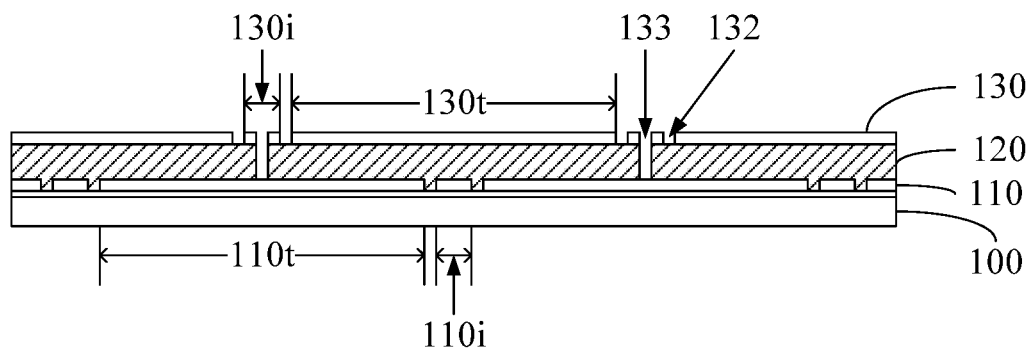
Figure 12:
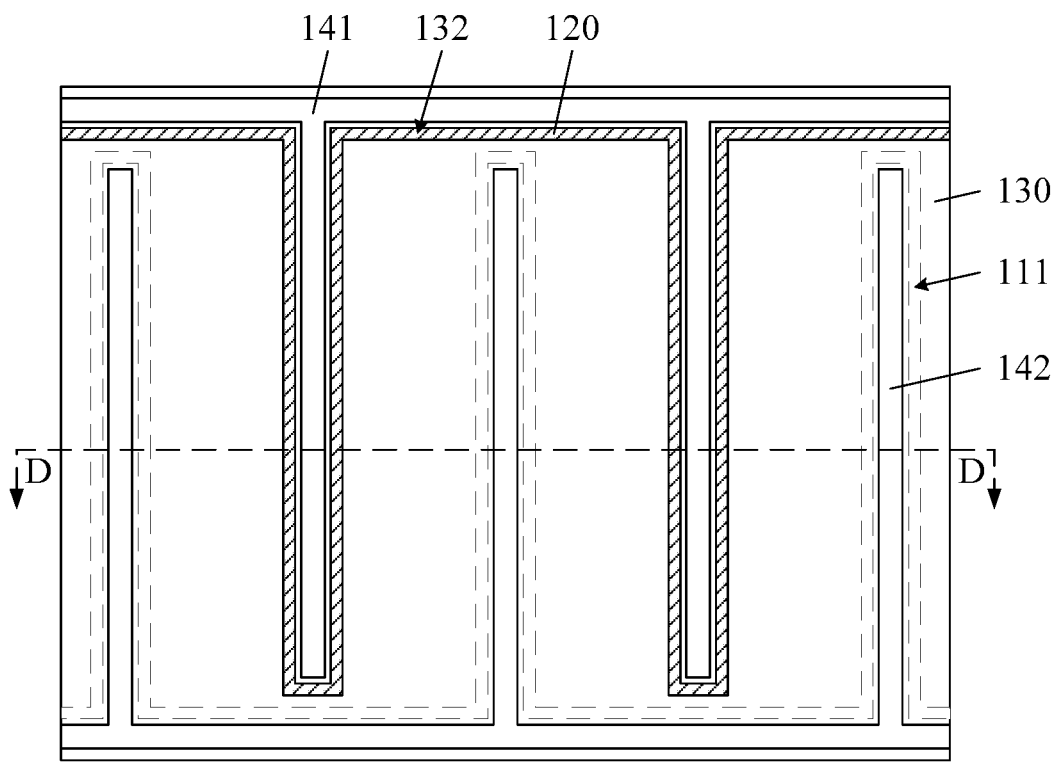
Figure 13:
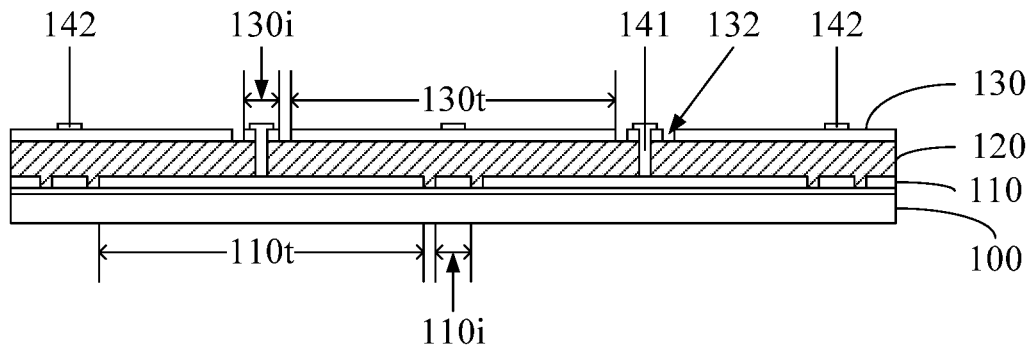

FIG. 10 to FIG. 13 are schematic diagrams of an intermediate structure formed in steps of forming the first electrode in the first isolation region of the second conductive layer and forming the second electrode on the surface of the second conductive layer in the first conductive region. The first electrode penetrates through the electrochromic layer and is electrically connected to the first conductive layer. The second electrode is electrically connected to the second conductive layer in the first conductive region. FIG. 10 and FIG. 12 are schematic top views. FIG. 11 is a sectional view taken along line CC in FIG. 10. FIG. 13 is a sectional view taken along line DD in FIG. 12.

Referring to step S510 in FIG. 2 and in conjunction with FIG. 10 and FIG. 11, a third trench 133 sequentially across the second conductive layer 130 and the color changing functional layer 120 is formed firstly.

The third trench 133 is located in the second conductive layer 130 in the upper isolation region 130i. The third trench 133 penetrates through the color changing functional layer 120, and the first conductive layer 110 is exposed at the bottom through the third trench 133. A width of the third trench 133 ranges from 1 μm to 50 μm. In order to reduce process difficulty and improve the manufacturing yield, optionally, the width of the third trench 133 ranges from 2 μm to 10 μm.

The third trench 133 may be formed with a laser scribing process. In an example, the third trench 133 may be formed with a visible light laser scribing process or an infrared light laser scribing process. In addition, in the laser scribing process, a constant power output or a pulsed power output may be adopted. Optionally, in some embodiments, the third trench 133 is formed with a pulsed laser scribing process, a frequency of the pulse ranges from 5 KHz to 500 KHz, and a power of the laser ranges from 0.1 W to 10 W. In some embodiments, the power of the laser ranges from 0.5 W to 5 W. It is to be noted that the method for forming the third trench 133 with the laser scribing process is only an example, and the method for forming the third trench 133 is not limited in the present disclosure.

It is to be noted that, referring to step S511 in FIG. 2, after the step of forming the third trench 133, the method may further include a step of cleaning up dust and residue, so as to improve the manufacturing yield of the electrochromic structure.

Next, referring to step S520 in FIG. 2, a first electrode is formed in the first isolation region of the second conductive layer. The first electrode penetrates through the electrochromic layer and is electrically connected to the first conductive layer. A second electrode is formed on the surface of the second conductive layer in the first conductive region. The second electrode is electrically connected to the second conductive layer in the first conductive region.

Referring to FIG. 12 and FIG. 13, after the third trench 133 is formed, the third trench 133 is filled with a conductive material to form the first electrode 141. The first electrode 141 is located in the upper isolation region 130i. The first electrode 141 penetrates through the color changing functional layer 120 and is electrically connected to the first conductive layer 110 in the lower conductive region 110t. The second electrode 142 is located on the surface of the second conductive layer 130 in the upper conductive region 130t, and is electrically connected to the second conductive layer 130 in the upper conductive region 130t.

The first electrode 141 is configured to apply a voltage signal to the first conductive layer 110, and the second electrode 142 is configured to apply a voltage signal to the second conductive layer 130, such that an electrical field is formed between the first conductive layer 110 and the second conductive layer 130, thereby achieving control to the color of the color changing functional layer 120.

The first electrode 141 is electrically isolated from the second electrode 142 due to the electrical isolation between the upper isolation region 130i and the upper conductive region 130t, such that both the first electrode 141 and the second electrode 142 can be located on the surface of the second conductive layer 130. In this way, the first electrodes 141 and the second electrodes 142 can be uniformly distributed on the surface of the electrochromic structure, thereby improving uniformity of the electric field between the first conductive layer 110 and the second conductive layer 130, improving color changing uniformity of the color changing functional layer 120, and improving the color changing speed of the electrochromic structure, thus facilitating enlargement of area of the electrochromic glass, and an electrochromic glass with a large area changes color faster and more uniform.

In addition, with the electrical isolation between the lower isolation region 110i and the lower conductive region 110t, the electrical isolation between the first electrode 141 and the first conductive layer 110 in the lower isolation region 110i can be improved. In this way, occurrence of circuit problems such as power leakage and short circuit is reduced, thereby improving the manufacturing yield of the electrochromic structure. The performance of the electrochromic structure is improved, thereby prolonging the service life of the electrochromic structure.

In addition, a position of the second electrode 142 is opposite to a position of the lower isolation region 110i, and the lower isolation region 110i is isolated from the lower conductive region 110t, thereby further improving the electrical isolation, thus reducing a risk of voltage breakdown.

The first electrode 141 and the second electrode 142 may be made of metal. The first electrode 141 or the second electrode 142 may be formed in a manner of screen printing, vacuum thermal evaporation coating, vacuum magnetron sputtering coating, vacuum ion source coating and inkjet printing.

In order to simplify the device structure and improve the manufacturing yield, in some embodiments of the present disclosure, the formed first electrode 141 may be arranged in parallel with the upper trench 132, and the second electrode 142 may be arranged in parallel with the lower trench 111. In addition, the first electrode 141 and the second electrode 142 may also be arranged in parallel with each other.

In a case where the number of the first electrodes 141 is greater than one, the first electrodes 141 may be arranged in parallel with each other. In a case where the number of the second electrodes 142 is greater than 1, the second electrodes 142 may also be arranged in parallel with each other.

In addition, in order to improve the uniformity of the electric field between the first electrode 141 and the second electrode 142, the second electrode 142 and the first electrode 141 are arranged in an alternate manner. That is, in a case where the electrochromic structure includes multiple first electrodes or multiple second electrodes 142, the first electrode 141 is distributed between adjacent second electrodes 142, or the second electrode 142 is distributed between adjacent first electrodes 141.

In an example shown in FIG. 12, the number of the first electrodes 141 is two, and the number of the second electrodes 142 is three. One first electrode 141 is arranged between adjacent second electrodes 142, and distances from the first electrode 141 to the adjacent second electrodes 142 are equal. One second electrode 142 is arranged between adjacent first electrodes 141, and distances from the second electrode 142 to the adjacent first electrodes 141 are equal.

In another implementation, the number of the electrodes may be determined based on an actual area of an electrochromic structure. In some embodiments, a pair of the first electrode and the second electrode may be arranged in a certain range. That is, in the above embodiment, the second conductive layer may be divided into multiple isolation regions with the number equal to that of the first electrodes and multiple conductive regions with the number equal to that of the second electrodes, and the first conductive layer may be divided into multiple isolation regions and multiple conductive regions accordingly. In practice, if the area is small, there may be arranged only one first electrode and one second electrode. That is, there is only one pair of the first electrode and the second electrode. However, both the first electrode and the second electrode are located on one side of the electrochromic layer. In some embodiments, the first conductive layer may even not be divided, only the second conductive layer is divided into multiple isolation regions and multiple conductive regions, which can achieve uniform electrochromic color change in a large area.

Referring to step S600 in FIG. 2, a first light shielding layer for shielding the first isolation region is formed.

Figure 14:
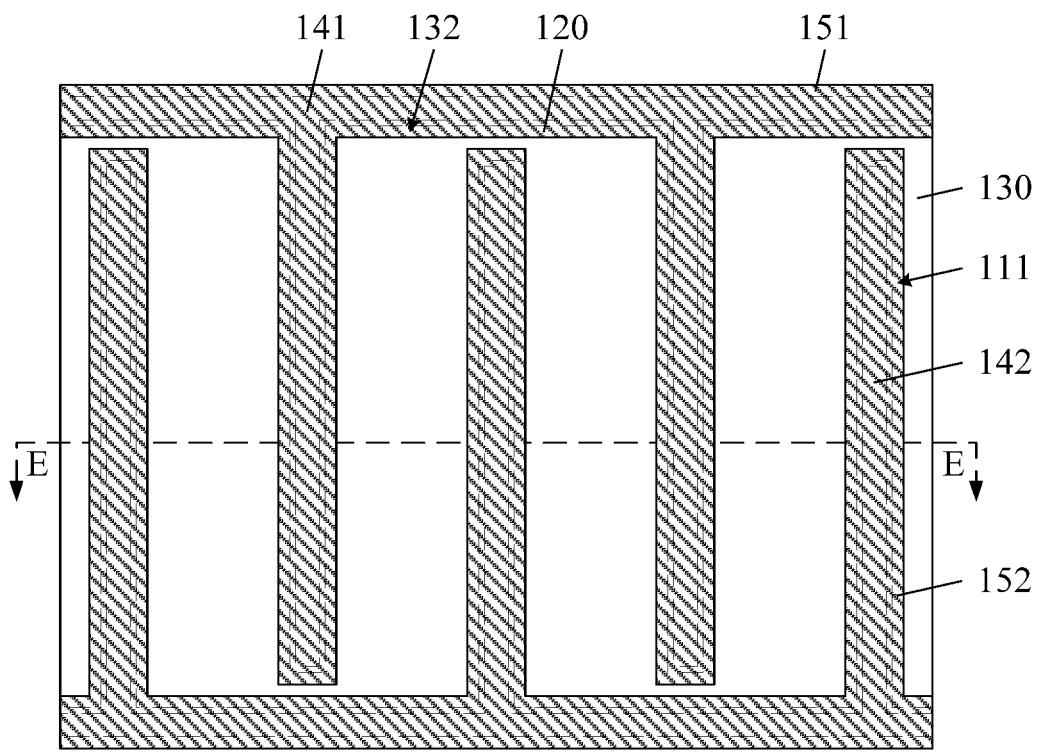
Figure 15:
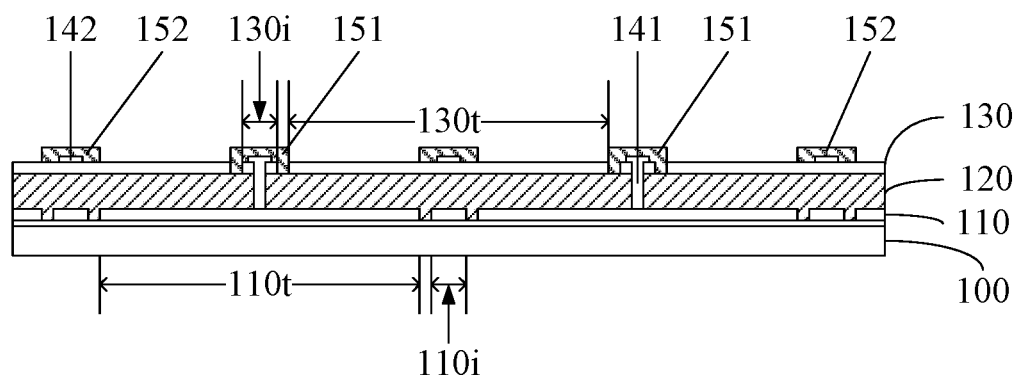

Reference is made to FIG. 14 and FIG. 15, where FIG. 14 is a top view of an intermediate structure of the electrochromic structure, and FIG. 15 is a sectional view taken along line EE in FIG. 14. A first light shielding layer 151 for shielding the upper isolation region 130i is formed to shield light.

In the case where a voltage is applied to change color, since no electric field can be formed between the upper isolation region 130i and a region of the first conductive layer 110 located opposite to the upper isolation region 130i, a color of a region of the color changing functional layer 120 located opposite to the upper isolation region 130i cannot be changed, thereby resulting in light leakage. The first light shielding layer 151 is configured to shield light passing through the upper isolation region 130i after the color is changed due to an applied voltage, so as to improve the color changing uniformity of the electrochromic structure.

In some embodiments, the first light shielding layer 151 is made of a black material. According to a visual rule, compared with white lines in a black background, black lines in a white background are more easily overlooked. Therefore, with the first light shielding layer 151, the light leakage of the electrochromic structure can be effectively avoided, thereby improving the performance of the electrochromic glass.

In some embodiments of the present disclosure, the first light shielding layer 151 is formed on the surface of the second conductive layer 130, such that the first light shielding layer 151 covers the first electrode 141 and the second conductive layer 130 in the upper isolation region 130i.

In addition, an upper trench 132 is also formed in the second conductive layer 130 (as shown in FIG. 6). Therefore, the first light shielding layer 151 may also shield the upper trench. In an example, the first light shielding layer 151 covers the first electrode 141 and the second conductive layer 130 in the upper isolation region 130i, and extends into the upper trench 132.

Further, due to the diffraction of light, in some embodiments, a projected area of the first light shielding layer 151 on the surface of the substrate 100 is larger than a projected area of the upper isolation region 130i on the surface of the substrate 100, thereby avoiding light leakage at an edge of the first light shielding layer 151.

In some embodiments of the present disclosure, a lower isolation region 110i and a lower conductive region 110t are also arranged in the first conductive layer 110. Similar to the upper isolation region 130i in the second conductive layer 130, in a case where the color is changed due to an applied voltage, a color of a region of the color changing functional layer 120 located opposite to the lower isolation region 110i cannot be changed, thus light leakage occurs in the region. Therefore, the electrochromic structure may further include: a second light shielding layer 152 for shielding the lower isolation region 110i. The method further includes: forming a second light shielding layer 152 for shielding the lower isolation region 110i to shield light.

In some embodiments of the present disclosure, a position of the second electrode 142 is opposite to a position of the lower isolation region 110i. The second light shielding layer 152 covers the second electrode 142 and a portion of the second conductive layer 130 in the upper conductive region 130t located opposite to the lower isolation region 110i.

In addition, in some embodiments, the lower trench 111 is also formed in the first conductive layer 110 (as shown in FIG. 4). The second light shielding layer 152 also shields the lower trench 111. In an example, the position of the second electrode 141 is opposite to the position of the lower isolation region 110i. The second light shielding layer 152 covers the second electrode 142 and a portion of the second conductive layer 130 in the upper conductive region 130t located opposite to the lower isolation region 110i and the lower trench 111.

Further, due to the diffraction of light, in some embodiments, a projected area of the second light shielding layer 152 on the surface of the substrate 100 is greater than a projected area of the lower isolation region 110i on the surface of the substrate 100, thereby avoiding light leakage at an edge of the lower isolation region 110i.

The first light shielding layer 151 or the second light shielding layer 152 may be formed in a manner of screen printing, vacuum thermal evaporation coating, vacuum magnetron sputtering coating, vacuum ion source coating and inkjet printing.

Figure 16:
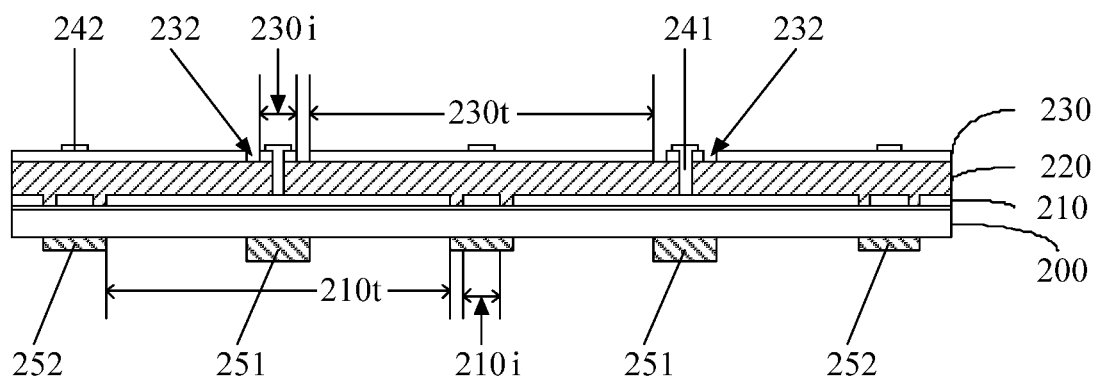
FIG. 16 is a schematic sectional view of a method for forming an electrochromic structure according to another embodiment of the present disclosure.

Referring to FIG. 16, a schematic sectional view of a method for forming an electrochromic structure according to another embodiment of the present disclosure is shown.

The same parts between the embodiment and the above embodiments are not described again, and a difference between the embodiment and the above embodiments is that, in this embodiment, the first light shielding layer 251 is located on a surface of the substrate 200 on which the first conductive layer 210, the color changing functional layer 220, the second conductive layer 230, the first electrode 241 and the second electrode 242 are not formed.

In a step that the first conductive layer 210 is formed, the first conductive layer 210, the color changing functional layer 220, the second conductive layer 230, the first electrode 241 and the second electrode 242 are formed on the first surface of the substrate 200. Therefore, in some embodiments, the first light shielding layer 251 covers a portion of the second surface of the substrate 100 located opposite to the upper isolation region 230i.

The first light shielding layer 251 is formed on the second surface of the substrate 200, and the first light shielding layer 251 is located opposite to the first isolation region 230i.

Since the first light shielding layer 251 is located on the second surface of the substrate 200, the electrical isolation between the first isolation region 230i and the first conductive region 230t of the second conductive layer 230 is not affected by the first light shielding layer 251. Therefore, in the embodiment, the first light shielding layer 251 may be made of a metal material, but the present disclosure is not limited thereto, and the first light shielding layer 251 may also be made of an opaque nonmetal material.

In addition, in some embodiments, a first trench 232 is also formed in the second conductive layer 230. Therefore, the first light shielding layer 251 also shields the first trench 232. In an example, the first light shielding layer 251 covers the second surface of the substrate 200 and is located opposite to the first isolation region 230i and the first trench 232.

Further, in some embodiments, the first conductive layer 210 includes a second isolation region 210i and a second conductive region 210t electrically isolated from each other. The method further includes: forming the second light shielding layer 252 on the second surface of the substrate 200. The second light shielding layer 252 is located opposite to the second isolation region 210i to shield light.

In some embodiments, electrical isolation between the second isolation region 210i and the second conductive region 210t in the first conductive layer 210 is achieved by the second trench. Therefore, the second shading layer 252 also shields the second trench. In an example, the second light shielding layer 252 is formed on the second surface of the substrate 200, and the second light shielding layer 252 is located opposite to the second isolation region 210i and the second trench.

It is to be noted that the first light shielding layer and the second light shielding layer are formed on the same surface of the substrate, such that the step of forming the first light shielding layer and the step of forming the second light shielding layer can be performed simultaneously, thereby facilitating simplified process steps and improving the manufacturing yield. However, the present disclosure is not limited to the case that the first light shielding layer and the second light shielding layer are formed the same surface of the substrate. In other embodiments of the present disclosure, the first light shielding layer and the second light shielding layer may be formed respectively on two surfaces of the substrate.

Similarly, an electrochromic structure is further provided according to the present disclosure. Referring to FIG. 14 and FIG. 15, a schematic structural diagram of an electrochromic structure according to an embodiment of the present disclosure is shown. FIG. 14 is a top view of the electrochromic structure, and FIG. 15 is a sectional view taken along line EE in FIG. 14.

The substrate 100 includes a first surface and a second surface opposite to the first surface. The first conductive layer 110 is located on at least one of the first surface and the second surface of the substrate 100. The color changing functional layer 120 is located on a surface of the first conductive layer 110. The second conductive layer 130 is located on a surface of the color changing functional layer 120. The second conductive layer 130 includes a first isolation region 130i and a first conductive region 130t electrically isolated from each other. The first electrode 141 is located in the first isolation region 130i of the second conductive layer 130 and located in the electrochromic layer 120 and is electrically connected to the first conductive layer 110. The second electrode 142 is located on a surface of the second conductive layer 130 in the first conductive region 130t and is electrically connected to the second conductive layer 130 in the first conductive region 130t. The first light shielding layer 151 is configured to shield the first isolation region 130i to shield light.

Generally, in the present disclosure, the first light shielding layer for shielding light is arranged to shield the first isolation region, such that light leaked from the first isolation region is shielded after the color of the electrochromic glass is changed, thereby facilitating improvement of color changing uniformity of the electrochromic glass, thus improving the performance of electrochromic glass.

Although the present disclosure is disclosed as above, the present disclosure is not limited thereto. Any person skilled in the art can make various changes and modifications without departing from the spirit and scope of the present disclosure. Therefore, the protection scope of the present disclosure should be defined by the claims.

The invention claimed is:

1. An electrochromic structure, comprising:
   a substrate comprising a first surface and a second surface opposite to the first surface;
   a first conductive layer located on the first surface of the substrate;
   a color changing functional layer located on a surface of the first conductive layer;
   a second conductive layer located on a surface of the color changing functional layer, wherein the second conductive layer is divided into a first isolation region and a first conductive region electrically isolated from each other;
   a first electrode located in the first isolation region of the second conductive layer, wherein the first electrode penetrates through the color changing functional layer and is electrically connected to the first conductive layer;
   a second electrode located on a surface of the second conductive layer in the first conductive region, wherein the second electrode is electrically connected to the second conductive layer in the first conductive region; and
   a first light shielding layer for shielding the first isolation region.

2. The electrochromic structure according to claim 1, wherein the first light shielding layer covers the first electrode and the second conductive layer in the first isolation region.

3. The electrochromic structure according to claim 1, wherein the first light shielding layer covers a portion of the second surface of the substrate located opposite to the first isolation region.

4. The electrochromic structure according to claim 1, wherein a projected area of the first light shielding layer on a surface of the substrate is greater than a projected area of the first isolation region on the surface of the substrate.

5. The electrochromic structure according to claim 1, further comprising: a first trench across the second conductive layer, wherein the second conductive layer is divided into a first isolation region and a first conductive region by the first trench; and
   the first light shielding layer further shields the first trench.

6. The electrochromic structure according to claim 5, wherein the first light shielding layer covers the first electrode and the second conductive layer in the first isolation region, and extends into the first trench.

7. The electrochromic structure according to claim 5, wherein the first light shielding layer covers a portion of the second surface of the substrate located opposite to the first isolation region and the first trench.

8. The electrochromic structure according to claim 7, wherein the first light shielding layer is made of a material comprising metal or opaque nonmetal.

9. The electrochromic structure according to claim 1, wherein the first conductive layer comprises a second isolation region and a second conductive region electrically isolated from each other,
   the electrochromic structure further comprises a second light shielding layer for shielding the second isolation region.

10. The electrochromic structure according to claim 9, wherein a position of the second electrode is opposite to a position of the second isolation region, and the second light shielding layer covers the second electrode and a portion of the second conductive layer in the first conductive region located opposite to the second isolation region.

11. The electrochromic structure according to claim 9, wherein the second light shielding layer covers a portion of the second surface of the substrate located opposite to the second isolation region.

12. The electrochromic structure according to claim 9, wherein a projected area of the second light shielding layer on a surface of the substrate is greater than a projected area of the second isolation region on the surface of the substrate.

13. The electrochromic structure according to claim 9, further comprising a second trench across the first conductive layer, wherein the first conductive layer is divided into a second isolation region and a second conductive region by the second trench; and
    the second light shielding layer further shields the second trench.

14. The electrochromic structure according to claim 13, wherein a position of the second electrode is opposite to a position of the second isolation region, and the second light shielding layer covers the second electrode and a portion of the second conductive layer in the first conductive region located opposite to the second isolation region and the second trench.

15. The electrochromic structure according to claim 13, wherein the second light shielding layer covers a portion of the second surface of the substrate located opposite to the second isolation region and the second trench.

16. The electrochromic structure according to claim 9, wherein a width of the first isolation region and a width of the second isolation region range from 1 μm to 500 μm, a width of the first conductive region and a width of the second conductive region range from 1 cm to 500 cm.

17. The electrochromic structure according to claim 1, wherein the substrate comprises a light transmitting substrate.

18. The electrochromic structure according to claim 1, further comprising a blocking layer located between the substrate and the first conductive layer.

19. The electrochromic structure according to claim 1, wherein the first conductive layer and the second conductive layer are made of a material comprising a transparent conductive oxide.

20. A method for forming an electrochromic structure, comprising:
    providing a substrate, wherein the substrate comprises a first surface and a second surface opposite the first surface;
    forming a first conductive layer on the first surface of the substrate;
    forming a color changing functional layer on a surface of the first conductive layer;
    forming a second conductive layer on a surface of the color changing functional layer, wherein the second conductive layer comprises a first isolation region and a first conductive region electrically isolated from each other;
    forming a first electrode in the first isolation region of the second conductive layer, wherein the first electrode penetrates through the color changing functional layer and is electrically connected to the first conductive layer;
    forming a second electrode on a surface of the second conductive layer in the first conductive region, wherein the second electrode is electrically connected to the second conductive layer in the first conductive region; and
    forming a first light shielding layer for shielding the first isolation region.

21. The method according to claim 20, wherein the first light shielding layer covers the first electrode and the second conductive layer in the first isolation region.

22. The method according to claim 20, wherein the first light shielding layer is formed at a portion of the second surface of the substrate located opposite to the first isolation region.

23. The method according to claim 20, wherein a projected area of the first light shielding layer on a surface of the substrate is greater than a projected area of the first isolation region on the surface of the substrate.

24. The method according to claim 20, wherein after forming the second conductive layer and before forming the first electrode, the method further comprises: forming a first trench across the second conductive layer, wherein the second conductive layer is divided into a first isolation region and a first conductive region by the first trench; and
    the first light shielding layer further shields the first trench.

25. The method according to claim 24, wherein the first light shielding layer covers the first electrode and the second conductive layer in the first isolation region, and extends into the first trench.

26. The method according to claim 24, further comprising: forming the first light shielding layer at a portion of the second surface of the substrate located opposite to the first isolation region and the first trench.

27. The method according to claim 20, wherein the first conductive layer comprises a second isolation region and a second conductive region electrically isolated from each other;
    the method further comprises: forming a second light shielding layer for shielding the second isolation region.

28. The method according to claim 27, wherein a position of the second electrode is opposite to a position of the second isolation region, and the second light shielding layer covers the second electrode and a portion of the second conductive layer in the first conductive region located opposite to the second isolation region.

29. The method according to claim 27, wherein the second light shielding layer is formed at a portion of the second surface of the substrate located opposite to the second isolation region.

30. The method according to claim 27, wherein a projected area of the second light shielding layer on a surface of the substrate is greater than a projected area of the second isolation region on the surface of the substrate.

31. The method according to claim 27, wherein after forming the first conductive layer and before forming the color changing functional layer, the method further comprises: forming a second trench across the first conductive layer, wherein the first conductive layer is divided into a second isolation region and a second conductive region by the second trench;
    the second light shielding layer further shields the second trench.

32. The method according to claim 31, wherein a position of the second electrode is opposite to a position of the second isolation region, and the second light shielding layer covers the second electrode and a portion of the second conductive layer in the first conductive region located opposite to the second isolation region and the second trench.

33. The method according to claim 31, wherein the second light shielding layer is formed at a portion of the second surface of the substrate located opposite to the second isolation region and the second trench.

34. The method according to claim 27, wherein the first light shielding layer or the second light shielding layer is formed in a manner of screen printing, vacuum thermal evaporation coating, vacuum magnetron sputtering coating, vacuum ion source coating or inkjet printing.

\* \* \* \* \*